United States Patent
Liu et al.

(10) Patent No.: US 11,418,485 B2
(45) Date of Patent: Aug. 16, 2022

(54) PATTERN-BASED MALICIOUS URL DETECTION

(71) Applicant: Palo Alto Networks, Inc., Santa Clara, CA (US)

(72) Inventors: Fang Liu, Lubbock, TX (US); Yuchen Zhou, Newark, CA (US); Jun Wang, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 28 days.

(21) Appl. No.: 16/941,129

(22) Filed: Jul. 28, 2020

(65) Prior Publication Data

US 2022/0038424 A1    Feb. 3, 2022

(51) Int. Cl.
| | |
|---|---|
| *G06F 15/16* | (2006.01) |
| *H04L 9/40* | (2022.01) |
| *H04L 67/02* | (2022.01) |

(52) U.S. Cl.
CPC ...... *H04L 63/0236* (2013.01); *H04L 63/1416* (2013.01); *H04L 63/1483* (2013.01); *H04L 63/20* (2013.01); *H04L 67/02* (2013.01)

(58) Field of Classification Search
CPC ............... H04L 63/1416; H04L 63/145; H04L 63/1466; H04L 63/1408; H04L 63/0236; H04L 67/02
See application file for complete search history.

(56) References Cited

U.S. PATENT DOCUMENTS 8,521,667 B2   8/2013 Zhu et al.
9,298,824 B1   3/2016 Vinnik et al.
(Continued)

FOREIGN PATENT DOCUMENTS

| EP | 3716574 A1 | 9/2020 | |
|---|---|---|---|
| WO | WO-2013009713 A2 * | 1/2013 | ............. G06F 21/51 |

OTHER PUBLICATIONS

S. Morishige, S. Haruta, H. Asahina and I. Sasase, "Obfuscated malicious javascript detection scheme using the feature based on divided URL," 2017 23rd Asia-Pacific Conference on Communications (APCC), 2017, pp. 1-6, doi: 10.23919/APCC.2017.8303992.*

(Continued)

*Primary Examiner* — Chirag R Patel
(74) *Attorney, Agent, or Firm* — Gilliam IP PLLC

(57) ABSTRACT

To perform pattern-based detection of malicious URLs, patterns are first generated from known URLs to build a pattern repository. A URL is first normalized and parsed, and keywords are extracted and stored in an additional repository of keywords. Tokens are then determined from the parsed URL and tags are associated with the parsed substrings. Substring text may also be replaced with general identifying information. Patterns generated from known malicious and benign URLs satisfying certain criteria are published to a pattern repository of which can be accessed during subsequent detection operations. During detection, upon identifying a request which indicates an unknown URL, the URL is parsed and tokenized to generate a pattern. The repository of malicious URL patterns is queried to determine if a matching malicious URL pattern can be identified. If a matching malicious URL pattern is identified, the URL is detected as malicious.

20 Claims, 9 Drawing Sheets

(56) References Cited

U.S. PATENT DOCUMENTS

| | | |
|---|---|---|
| 2012/0158626 A1 | 6/2012 | Zhu et al. |
| 2021/0097168 A1* | 4/2021 | Patel .................... G06F 21/554 |
| 2021/0203692 A1* | 7/2021 | Nunes .................... G06N 20/00 |
| 2021/0211463 A1* | 7/2021 | Cleveland ........... H04L 63/1483 |
| 2021/0312041 A1* | 10/2021 | Guru .................. G06F 21/6227 |

OTHER PUBLICATIONS

Sahingoz, Ozgur & Buber, Ebubekir & Demir, Onder & Diri, Banu. (2019). Machine learning based phishing detection from URLs. Expert Systems with Applications. 117. 345-357.*

Ma, et al., "Beyond Blacklists: Learning to Detect Malicious Web Sites from Suspicious URLs", Proceedings of the 15th ACM SIGKDD International Conference on Knowledge Discovery and Data Mining, 2009, 9 pages.

Yuan, et al., "TFD: A Multi-pattern Matching Algorithm for Large-Scale URL Filtering", 2013 International Conference an Computing, Networking and Communications, 2013, 5 pages.

PCT Application No. PCT/US2021/042654 International Search Report, dated Nov. 11, 2021, 4 pages.

PCT Application No. PCT/US2021/042654 Written Opinion, dated Nov. 11, 2021, 5 pages.

* cited by examiner

PATTERN-BASED MALICIOUS URL DETECTION

BACKGROUND

The disclosure generally relates to electric digital data processing and to security arrangements for protecting computers, components thereof, programs or data against unauthorized activity.

Malicious uniform resource locators (URLs) are commonly leveraged in carrying out web-based cyber attacks. For instance, malicious URLs can be associated with phishing scams or websites which host malicious content, such as websites which prompt download and installation of malware upon access. A variety of techniques can be implemented to reduce or prevent such attacks resulting from accessing resources through malicious URLs. Examples of techniques for detecting and/or blocking access to malicious URLs include deployment of a web crawler to identify malicious URLs, analyzing network traffic for malicious content, implementation of URL filtering policies (e.g., at a firewall), and establishing and maintaining a blacklist of URLs known to be malicious.

BRIEF DESCRIPTION OF THE DRAWINGS

Aspects of the disclosure may be better understood by referencing the accompanying drawings.

DESCRIPTION

Figure 1:
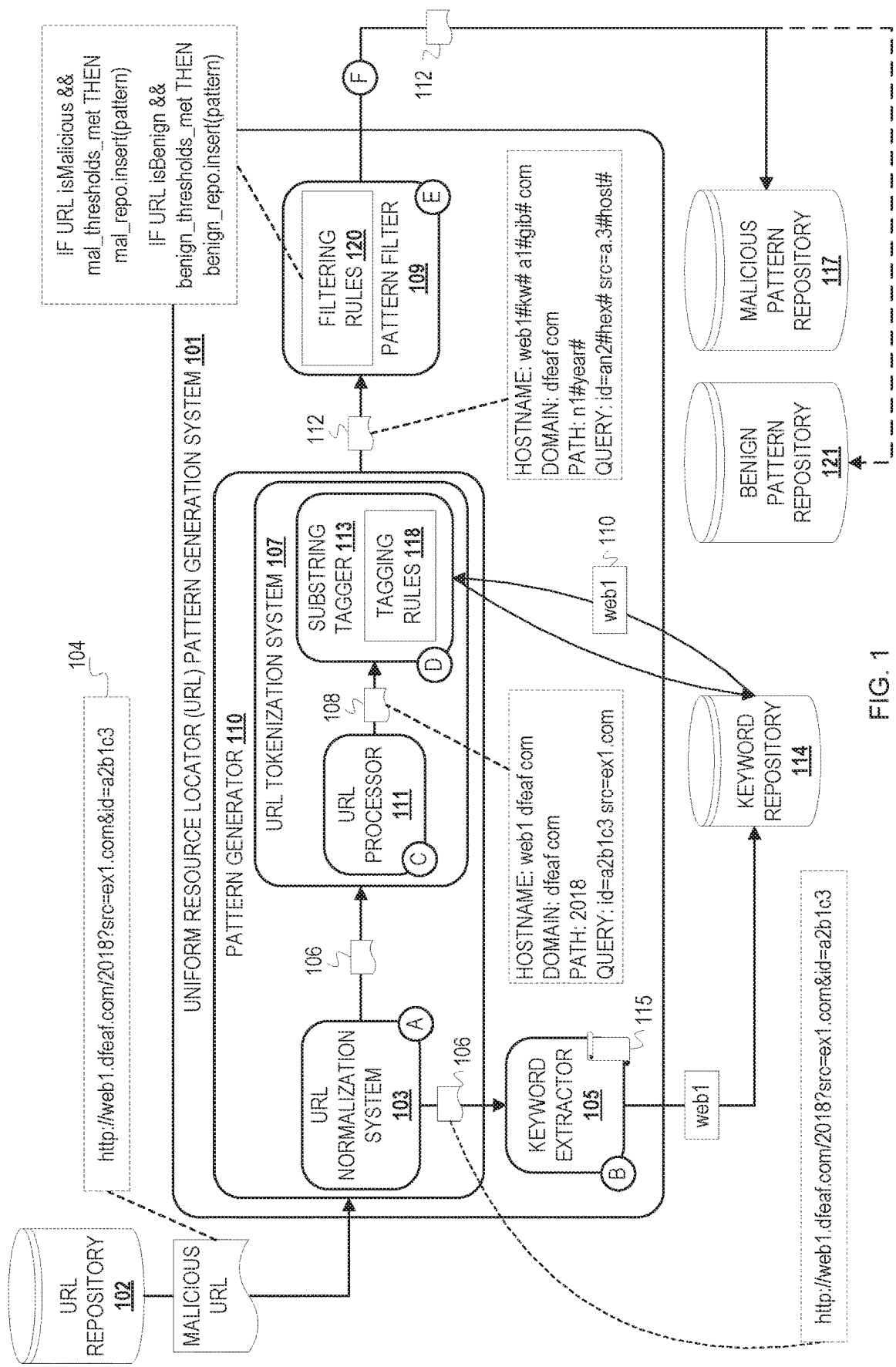
FIG. 1 depicts a conceptual diagram of generating patterns from known URLs and building a pattern repository from the generated patterns.

The description that follows includes example systems, methods, techniques, and program flows that embody aspects of the disclosure. However, it is understood that this disclosure may be practiced without these specific details. For instance, this disclosure refers to analyzing URLs indicated in Hypertext Transfer Protocol (HTTP) headers in illustrative examples. Aspects of this disclosure can be also applied to other implementations of leveraging URLs for identifying resources, such as in client-server communications according to the File Transfer Protocol (FTP) network protocol. In other instances, well-known instruction instances, protocols, structures and techniques have not been shown in detail in order not to obfuscate the description.

Overview

Although systems have been developed for detecting malicious URLs, countermeasures have been created for circumventing conventional systems, thereby reducing the efficacy of the conventional systems. For instance, malicious web content can be masked from a web crawler and presented as benign through cloaking. Short-lived or randomly generated URLs associated with malicious web content can also bypass URL filtering policies implemented at a firewall. As a result, malicious URLs may go undetected and malicious content subsequently accessed even with preventative measures in place.

To remediate these shortcomings of conventional techniques, a system for efficient pattern-based detection of malicious URLs has been developed. A pattern is formed by one or more tokens which comprise generalized representations of substrings that are identified in a URL while preserving commonly used keywords. A pattern can thus be considered to "abstract away" from the specific text of a URL such that variations among URLs are presented at a higher level of generality, such as differences in the length and type of a substring included in a URL parameter rather than differences between the particular characters of a substring. Analyzing unknown URLs by leveraging patterns rather than specific text or URL signatures facilitates detection of those which are malicious that may otherwise have gone undiscovered. Additionally, automated generation of patterns for URLs reduces the inefficiencies of manually creating URL signatures as with signature-based detection techniques.

The system first generates patterns from URLs known to be benign or malicious ("known URLs") to build a pattern repository of patterns which can facilitate detection of malicious URLs. To generate a pattern from a known URL, the URL is first normalized and parsed. Keywords are extracted from the URL based on a set of rules for identifying keywords and stored in an additional repository of keywords that can be accessed during both pattern generation and malicious URL detection operations. Tokens are then determined based on parsing the URL and associating tags with the parsed sub strings. Tags may indicate that a token corresponds to a keyword, year, email address, or host name, for example. In addition to the tag, the substring text may be replaced with general identifying information, such as an indication of whether the substring included letters and/or numbers and an indication of substring length. Patterns generated from known malicious URLs and/or known benign URLs which satisfy certain criteria (e.g., based on associated URL counts) are published to a pattern repository which can be accessed during subsequent detection operations. During detection, upon determining that a request has been issued which indicates an unknown URL, the system parses, tokenizes, and tags the unknown URL to generate a pattern and queries the repository of URL patterns to determine if at least a partial match with a malicious URL pattern can be identified. If a matching malicious URL pattern is identified, the URL is detected as malicious and access can subsequently be blocked.

Example Illustrations

FIG. 1 depicts a conceptual diagram of generating patterns from known URLs and building a pattern repository from the generated patterns. FIG. 1 depicts a URL pattern generation system ("pattern generation system") 101 which generates patterns from known malicious or benign URLs and, based on determining that the generated patterns satisfy criteria for insertion, inserts those corresponding to malicious URLs into a malicious pattern repository 117 and those corresponding to benign URLs but not malicious URLs into a benign pattern repository 121. While FIG. 1 depicts the malicious pattern repository 117 and benign pattern repository 121 as separate repositories, in some implementations, malicious and benign URL patterns can instead be maintained in a common database that may be indexed by pattern classification (i.e., malicious or benign) or in which entries are labeled based on pattern classification, for example. The pattern generation system 101 comprises a keyword extractor 105, a pattern generator 110, and a pattern filter 109. The pattern generator 110 includes a URL normalization system 103 and a URL tokenization system 107.

FIG. 1 depicts an example of pattern generation in which the pattern generation system 101 determines a pattern based on normalization and tokenization of a URL 104 known to be a malicious URL (hereinafter the "malicious URL 104") retrieved from a URL repository 102 that includes URLs already known to be malicious or benign. For instance, each URL retrieved from the URL repository 102 may be labeled as malicious or benign. As used herein, tokenization of a URL refers to generating a plurality of tokens of the URL based on parsing/splitting the URL into substrings, tagging the substrings based on substring type, and optionally determining a generalized representation of one or more of the substrings to replace the text of the substrings in the respective token.

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the URL normalization system 103 normalizes the URL 104 to a form which can subsequently be processed for pattern generation. The URL normalization system 103 pre-processes the URL 104 to decode or otherwise translate the URL to a format which the subsequent components of the pattern generation system 101 can recognize. For instance, the URL normalization system 103 may determine whether the URL 104 includes any non-readable strings to improve the readability of the URL 104 by removing or translating the non-readable strings. Alternatively or in addition, the URL normalization system 103 can decode the URL 104 if the URL 104 comprises substrings which are not recognized for pattern generation (e.g., if the URL 104 has been encoded). The URL normalization system 103 pre-processes the URL 104 by decoding the URL 104 and/or otherwise removing non-readable strings to generate normalized URL 106.

At stage B, the keyword extractor 105 identifies substrings of the normalized URL 106 which are keywords and "extracts" a copy of the identified substrings for insertion into a keyword repository 114. The keyword extractor 105 analyzes the normalized URL 106 based on keyword extraction rules 115 to determine whether the normalized URL 106 includes any keywords which should be inserted into the keyword repository 114. Keywords are substrings commonly used in URLs which are to be preserved during pattern generation, such as file names (e.g., "index.php").

The keyword extractor 105 can determine substrings which should be accounted for as keywords by parsing the normalized URL 106 based on one or more delimiters and evaluating each of the resulting substrings against the keyword extraction rules 115. The keyword extraction rules 115 may comprise rules for determining that a substring should be considered a keyword if a frequency with which the substring appears in URLs (e.g., the URLs in the URL repository 102 or a representative subset thereof) satisfies a threshold. Substring frequencies may have been previously determined and may, for example, be updated as URLs are inserted into the URL repository 102. In this example, the keyword extractor 105 determines that the substring "web1" satisfies the keyword extraction rules 115 and inserts "web1" into the keyword repository 114 (e.g., via an application programming interface (API) for a database insert command, an API for an HTTP PUT request issued to a server which maintains the keyword repository 114, etc.).

At stage C, a URL processor 111 of the URL tokenization system 107 parses the normalized URL 106 to generate a parsed URL 108. The URL processor 111 parses the normalized URL 106 string and splits the query string of the normalized URL 106 based on delimiters used for separating URL components, such as "/" (forward slash), "?" (question mark), and "&" (ampersand). The URL processor 111 may also sort substrings yielded from the parsing by URL component. For instance, the URL processor 111 can sort substrings by hostname, domain, path, and query components of the URL as in this example, where the key/value pairs of parameters included in the query are maintained. The URL processor 111 can sort the substrings based on the delimiters used for separating URL components which were indicated in the normalized URL 106. The resulting parsed URL 108 includes substrings corresponding to each of the hostname, domain, path, and query components of the normalized URL 106.

At stage D, a substring tagger 113 of the URL tokenization system 107 tags substrings of the parsed URL 108 to generate a pattern 112 formed by a plurality of tokens. Tags indicate a type associated with the substring and can be considered to categorize a substring based on its type. The substring tagger 113 first submits queries indicating substrings of the parsed URL 108 to the keyword repository 114 to identify those which correspond to keywords. In this example, the substring tagger 113 determines that "web 1" is a keyword based on results of a query indicating the substring "web1" submitted to the keyword repository 114. The substring tagger 113 tags the substring "web1" as a keyword, where the tag used for denoting keywords in this example is depicted as "#kw #", to generate a token depicted as "web1#kw #". Tokens generated from keywords comprise tagged keywords in which the substring itself is maintained, such as "web1#kw #". The substring tagger 113 evaluates the remaining substrings which are not determined to be keywords based on the tagging rules 118. Tokens generated from non-keyword substrings can comprise abstracted representations of the substrings and the associated tags that are determined based on the tagging rules 118. Subsequent operations for determining the tags and abstracted representations of non-keyword substrings which are described at stage D are performed for each non-keyword substring of the parsed URL 108, where "the substring" refers to the non-keyword substring of the parsed URL 108 on which the substring tagger 113 currently operates.

The substring tagger 113 can determine a tag corresponding to the substring based on the tagging rules 118. Tags may be indicated in the tagging rules 118 for substrings which correspond to a year, hexadecimal number, hostname (e.g., of an email address included as a parameter in the URL query), and "gibberish" (e.g., a sequence of characters which satisfy a threshold for randomness), for example. These tags are represented in FIG. 1 as "#year #", "#hex #", "#host #", and "#gib #", respectively, although these are depicted as examples, and specific representations can vary among implementations. The substring tagger 113 can determine if a tag should be associated with the substring based on evaluation of the substring in view of the tagging rules 118. Each of the tagging rules 118 may indicate a tag and a corresponding regular expression(s). If a regular expression indicated in the tagging rules 118 matches the substring, the respective tag can then be associated with the substring. For instance, the sub string tagger 113 can determine whether the substring corresponds to an email address, hexadecimal number, or year based on regular expressions corresponding to each of these substring types indicated in the tagging rules 118. As an example, the substring tagger 113 determines that the substring "id=a2b1c2" comprises a value in a key-value pair which is a hexadecimal number and thus tags the substring with the tag for hexadecimal number indicated in the tagging rules 118, depicted in FIG. 1 as "#hex #".

The substring tagger 113 also can determine a generalized or abstracted representation of the substring which was tagged to generate the corresponding token. The substring tagger 113 determines a generalized representation of the substring based on various characteristics or qualities of the substring. For instance, the substring tagger 113 can determine the generalized representation based on substring length and whether the substring includes letters, numbers, and/or symbols. The generalized representation that is generated can comprise a sequence of identifiers associated with these characteristics. In this example, the sub string tagger 113 uses the identifier "a" if the substring includes characters which are letters and "n" if the substring includes characters which are numbers. If the substring includes characters which are symbols, such as an email address substring, the symbols can be included as identifiers in the generalized representation (e.g., "@", ".", etc.) The generalized representation can also include an identifier indicative of substring length, where the substring tagger 113 selects numeric identifiers indicative of substring length in this example (e.g., based on character count ranges). The substring tagger 113 can then concatenate the determined identifiers and replace the substring in the token representation with the string of identifiers. For example, for the substring "id=a2b1c3" tagged with "#hex #", the substring tagger 113 determines that the substring includes letters and numerals and is associated with a length identifier of 2 and thus determines the corresponding generalized representation of "id=an2" to create a token represented as "id=an2#hex #".

Once each of the substrings in the parsed URL 108 has been evaluated based on queries submitted to the keyword repository 114 and/or the tagging rules 118 and the corresponding token generated, the result output by the substring tagger 113 is the pattern 112. The pattern 112 is formed by a plurality of tokens which comprise tagged keywords and/or tagged generalized representations of sub strings. The pattern 112 can also be considered to be formed by sub-patterns corresponding to each component of the URL 104. For example, the subsets of tokens determined for each of the hostname, domain, path, and query components can be considered to form sub-patterns of the pattern 112 (e.g., a hostname pattern, domain pattern, path pattern, and query pattern, respectively). Although sub-patterns are patterns, the term "sub-pattern" is used with respect to a URL. For instance, multiple patterns may be generated from a URL and referred to as "sub-patterns" since the aggregate at least partially form the URL.

At stage E, the pattern filter 109 determines whether to insert the pattern 112 into the malicious pattern repository 117 or the benign pattern repository 121 based on filtering rules 120. The malicious pattern repository 117 stores patterns which were generated from known malicious URLs, while the benign pattern repository 121 stores patterns which were generated from known benign URLs and have not been generated from a known malicious URL. To determine whether the pattern 112 should be inserted into the malicious pattern repository 117 or the benign pattern repository 121, the pattern filter 109 determines the classification of the URL 104 (e.g., based on a label associated with the URL 104) and whether the URL 104 from which the pattern 112 was generated satisfies a first of the filtering rules 120 maintained for the respective URL classification and, if so, inserts the pattern 112 into the appropriate pattern repository. The filtering rules 120 may indicate URL count thresholds for insertion of a pattern into each of the repositories, depicted in FIG. 1 as insertion criteria "mal_thresholds_met" and "benign_thresholds_met" for patterns generated from malicious and benign URLs, respectively. The URL count thresholds may indicate a count of how many times a pattern should be generated from a malicious URL or benign URL before it is inserted into the malicious pattern repository 117 or the benign pattern repository 121, respectively. Malicious and benign URL counts associated with patterns can be accumulated as the pattern filter 109 evaluates various patterns. The pattern filter 109 can thus base the determination of whether to insert the pattern 112 and in which repository to insert the pattern 112 on results of evaluating malicious and benign URL count(s) associated with the pattern 112 against the thresholds indicated in the filtering rules 120. For instance, the pattern filter 109 can determine that the URL 104 is a malicious URL and evaluate the malicious URL count of the pattern 112 against a threshold indicated in the filtering rules 120. The pattern filter 109 may also evaluate a benign URL count of the pattern 112 to determine whether the benign URL count is below a maximum benign URL count permitted for insertion of a pattern generated from a malicious URL into the malicious pattern repository 117. In this example, the pattern filter 109 identifies that the URL 104 from which the pattern 112 was generated is a known malicious URL which satisfies a first of the filtering rules 120 for insertion into the malicious pattern repository 117.

At stage F, the pattern filter 109 inserts the pattern 112 into the malicious pattern repository 117. The pattern filter 109 can insert the pattern 112 into the malicious pattern repository 117 via an API for a database insert command, an API for an HTTP PUT request issued to a server which maintains the malicious pattern repository 117 (not depicted in FIG. 1), etc. The pattern 112 is then available to be identified as a matching pattern during subsequent evaluation of unknown URLs based on submission of queries to the malicious pattern repository 117 as is described further in reference to FIG. 2.

Although FIG. 1 depicts the pattern generation system 101 as operating on one URL (i.e., the URL 104), the pattern generation system 101 can retrieve a plurality of URLs from the URL repository 102 to generate patterns for each of the plurality of URLs when building the malicious pattern repository 117 and benign pattern repository 121. In this case, the pattern generation system 101 can perform the operations described at stages A-D for each of the plurality of URLs to generate a plurality of patterns from the known URLs. Once the plurality of patterns have been generated, the pattern filter 109 can obtain the plurality of patterns and determine, for each pattern, a malicious URL count and a benign URL count based on which of the plurality of URLs resulted in generation of that pattern. The pattern filter 109 can then perform the operations described at stages E and F for each of the plurality of patterns based on the corresponding malicious and benign URL counts.

For instance, the pattern generation system 101 may obtain a set of 100 URLs, which includes the URL 104, from the URL repository 102. After generating a plurality of patterns from the set of 100 URLs as described in reference to stages A-D, the pattern filter 109 can obtain the plurality of patterns and determine malicious and benign URL counts of each of the plurality of patterns. As an example, the pattern filter 109 may determine that the pattern 112 was generated from a total of 30 of the 100 URLs, where 29 were malicious URLs and one was a benign URL. The pattern filter 109 can then evaluate these malicious and benign URL counts determined for the pattern 112 against the filtering rules 120 to determine whether at least a first of the rules 120 is satisfied. Returning to the previous example, if the filtering rules 120 indicate that a pattern should be considered a malicious URL pattern if it is generated from at least 25 malicious URLs and no more than 2 benign URLs, the pattern filter 109 will insert the pattern 112 into the malicious pattern repository 117.

Figure 2:
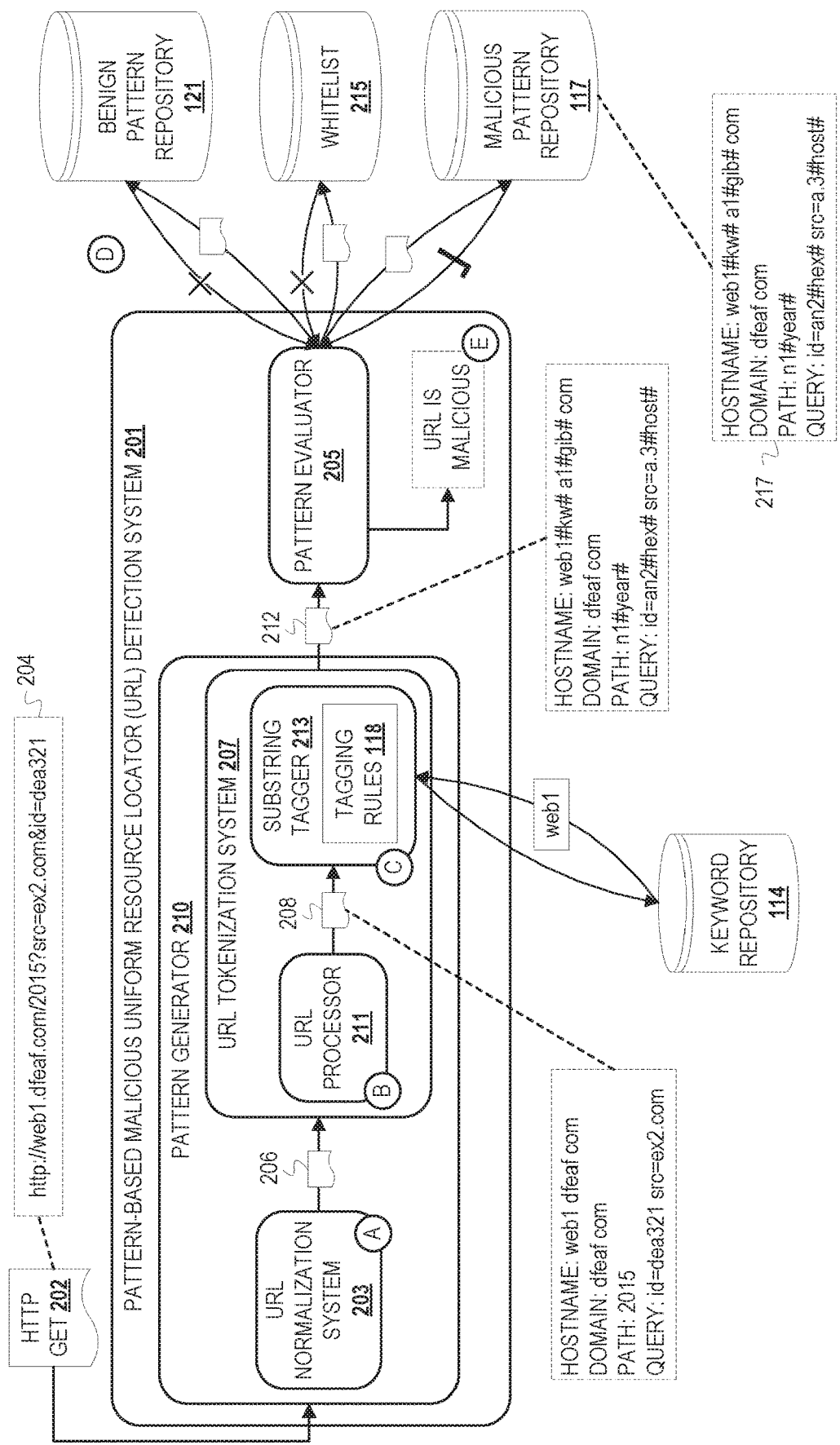
FIG. 2 depicts a conceptual diagram of determining if an unknown URL identified in a request is malicious through a pattern-based analysis of the URL.

FIG. 2 depicts a conceptual diagram of determining if an unknown URL identified in a request is malicious through a pattern-based analysis of the URL. FIG. 2 depicts a pattern-based malicious URL detection system ("detection system") 201 which identifies URLs indicated in requests for access to resources, generates a pattern for the identified URL, and determines if the URL is malicious based on the generated pattern. The detection system 201 can execute in a deployment environment on a network component at which network traffic can be detected and analyzed (e.g., a firewall). The detection system 201 comprises a pattern generator 210 that includes a URL normalization system 203 and a URL tokenization system 207 similar to the URL normalization system 103 and URL tokenization system 107 of the pattern generator 110 described in reference to FIG. 1. The detection system 201 also includes a pattern evaluator 205 which evaluates patterns generated from unknown URLs to identify those corresponding to malicious URLs based in part on submission of queries to the malicious pattern repository 117 and benign pattern repository 121 to determine if matching malicious URL patterns can be identified. As depicted in FIG. 2, the keyword repository 114, malicious pattern repository 117, and benign pattern repository described in reference to FIG. 1 are also accessible to the detection system 201.

FIG. 2 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, based on identifying a request indicating a URL 204, the URL normalization system 203 normalizes the URL 204 to a format which can subsequently be processed for pattern generation. The detection system 201 identifies the URL 204 indicated in a request 202 which comprises an HTTP request. The detection system 201 can analyze headers of incoming HTTP requests to identify URLs indicated in the HTTP requests, such as the URL 204. As similarly described in reference to FIG. 1 at stage A, the URL normalization system 203 determines whether the URL 204 includes any non-readable substring strings and/or substrings which are not recognizable for subsequent pattern generation, such as characters that were converted to an encoded format through URL encoding. The URL normalization system 203 can then remove the identified substrings, decode the URL 204, etc. to generate a normalized URL 206 for subsequent processing. In this example, the URL normalization system 203 determines that the URL 204 is already in a format which can be tokenized for pattern generation and uses the URL 204 string as the normalized URL 206.

At stage B, a URL processor 211 of the URL tokenization system 207 processes the normalized URL 206 to generate a parsed URL 208. The URL processor 211 comprises similar functionality to the URL processor 111 described in reference to FIG. 1. The URL processor 211 parses the normalized URL 206, including splitting the query string, and sorts substrings by components to generate the parsed URL 208 as similarly described in reference to FIG. 1 at stage C. The parsed URL 208 includes substrings corresponding to each of the hostname, domain, path, and query components of the normalized URL 206.

At stage C, a substring tagger 213 of the URL tokenization system 207 determines tags for and/or generalized representations of at least a subset of the substrings of the parsed URL 208 to generate a sequence of tokens that form a pattern 212. The substring tagger 213 comprises similar functionality to the substring tagger 113 described in reference to FIG. 1. Tagging rules 118 are attached to (i.e., installed on or otherwise accessible to) the substring tagger 213. This example depicts the substring tagger 213 as using the same set of tagging rules 118 as was leveraged for pattern generation from known URLs for added consistency in tokenization which is performed among different URLs. The substring tagger 213 evaluates substrings of the parsed URL 208 based on results of queries submitted to the keyword repository 114 and/or tagging rules 118 to determine tags to associate with the substrings as similarly described in reference to FIG. 1 at stage D. For instance, the substring tagger 213 determines that the substring "web1" is a keyword based on submitting a query to the keyword repository 114, tags "web 1" with the tag "#kw #", and subsequently tags at least a subset of the non-keyword substrings and replaces the substrings with an abstracted representation comprising a sequence of identifiers based on evaluating the substrings against the tagging rules 118.

Once substrings of the parsed URL 208 have been tagged based on queries submitted to the keyword repository 114 and/or the tagging rules 118 and the corresponding tokens generated, the result output by the substring tagger 213 is the pattern 212. The pattern 212 is formed by a plurality of tokens which can comprise tagged keywords and/or tagged generalized representations of non-keyword substrings. The pattern 212 may be considered to include sub-patterns for each URL component (i.e., a hostname pattern, a domain pattern, a path pattern, and a query pattern). For example, the sub-pattern of the pattern 212 corresponding to the URL query depicted in FIG. 2 is formed by the tokens "id=an2#hex #" and "src=a.3#host #".

At stage D, the pattern evaluator 205 determines if the pattern 212 is malicious. The determination of whether the pattern 212 is malicious is at least partly based on whether the pattern 212 matches a pattern previously generated from a malicious URL(s) that has been stored in the malicious pattern repository 117 and does not match a pattern previously generated from benign URLs that has been stored in the benign pattern repository 121. The pattern evaluator 205 submits a query indicating the pattern 212 to the malicious pattern repository 117 to determine whether the pattern 212 matches a pattern previously generated from a known malicious URL. In this example, the pattern evaluator 205 determines from the results of the submitted query that the pattern 212 matches a pattern 217 which was previously generated from a known malicious URL(s). Before a verdict is made for the pattern 212, the pattern evaluator 205 can also implement an additional verification to determine if the pattern 212 should not be indicated as malicious based on results of querying a whitelist 215 (e.g., an Internet Protocol (IP) whitelist) and the benign pattern repository 121. In this example, the pattern evaluator 205 queries the benign pattern repository 121 and a whitelist 215 to determine whether the pattern 212 should not be indicated as malicious based on association of the request 202 with a benign URL, IP address, etc. The whitelist 215 and benign pattern repository 121 can be queried before reporting a verdict for a pattern to prevent false detection of malicious URLs. In this example, the pattern evaluator 205 determines that results of the queries submitted to the whitelist 215 and the benign pattern repository 121 do not indicate that the pattern 212 corresponds to a benign URL.

At stage E, the pattern evaluator 205 determines that the URL 204 is malicious. The identification of a matching malicious URL pattern in the malicious pattern repository 117 and simultaneous absence of an indication that the pattern 212 is a benign URL pattern from the benign pattern repository 121 or the whitelist 215 triggers a determination by the pattern evaluator 205 that the URL 204 is malicious. Determining that the URL 204 is malicious may trigger a blocking of the request 202. A determination that the URL 204 is malicious may also prompt generation of a notification or alert that a malicious URL has been detected, logging of the attempted access, etc.

Figure 3:
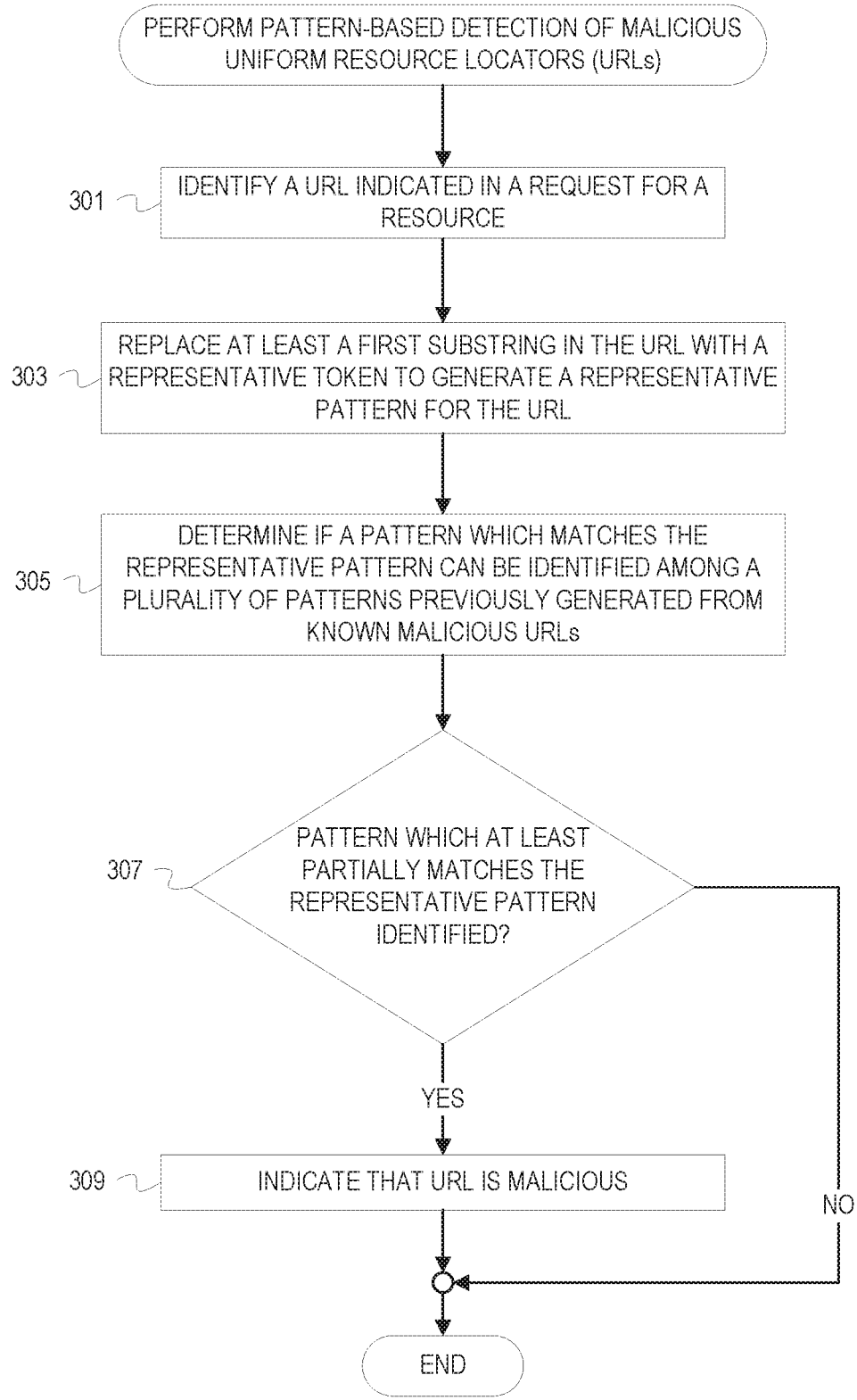
FIG. 3 depicts a flowchart of example operations for performing pattern-based detection of malicious URLs.

FIG. 3 depicts a flowchart of example operations for performing pattern-based detection of malicious URLs. The example operations are described with reference to a pattern-based malicious URL detection system ("detection system") for consistency with FIG. 2.

At block 301, the detection system identifies a URL indicated in a request for a resource. For instance, the detection system may monitor for HTTP requests. Upon identifying an incoming request, the detection system can identify a URL indicated in the HTTP header.

At block 303, the detection system replaces at least a first substring in the URL with a representative token to generate a representative pattern for the URL. The detection system parses components of the URL into substrings and may split the query into key/value pairs. A pattern can then be generated from the URL based on replacing at least a first of the substrings with a representative token, where the representative token comprises a tag indicative of substring type and/or a generalized representation of the substring (e.g., a string of identifiers corresponding to characteristics of the substring).

At block 305, the detection system determines if a pattern which matches the representative pattern can be identified among a plurality of patterns previously generated from known malicious URLs. The detection system submits a query indicating the representative pattern to a repository of patterns generated from known URLs, where the repository maintains the plurality of patterns previously generated from known malicious URLs, to determine if a first of the plurality of patterns stored in the repository matches the representative pattern. The determination of whether a pattern which matches the representative pattern can be identified is based on whether results of the submitted query indicate a malicious URL pattern stored in the repository with one or more sub-patterns (i.e., patterns corresponding to a URL component) in common with the representative pattern.

As indicated by block 307, operations continue based on whether the detection system identifies a first pattern of the plurality of patterns which at least partially matches the representative pattern (i.e., as a result of the determination at block 305). The first pattern can be considered to at least partially match the representative pattern if one or more sub-patterns of the representative pattern match a respective sub-pattern of the first pattern. If a first pattern of the plurality of patterns which at least partially matches the representative pattern is identified, operations continue at block 309. If no pattern which at least partially matches the representative pattern is identified, operations are complete.

At block 309, the detection system indicates that the URL is malicious. The detection system can indicate that the URL is malicious by blocking the request for the associated resource that was identified at block 301, for example. Alternatively or in addition, the detection system can log the attempted access, generate a notification indicating the URL is malicious, etc.

Figure 4:
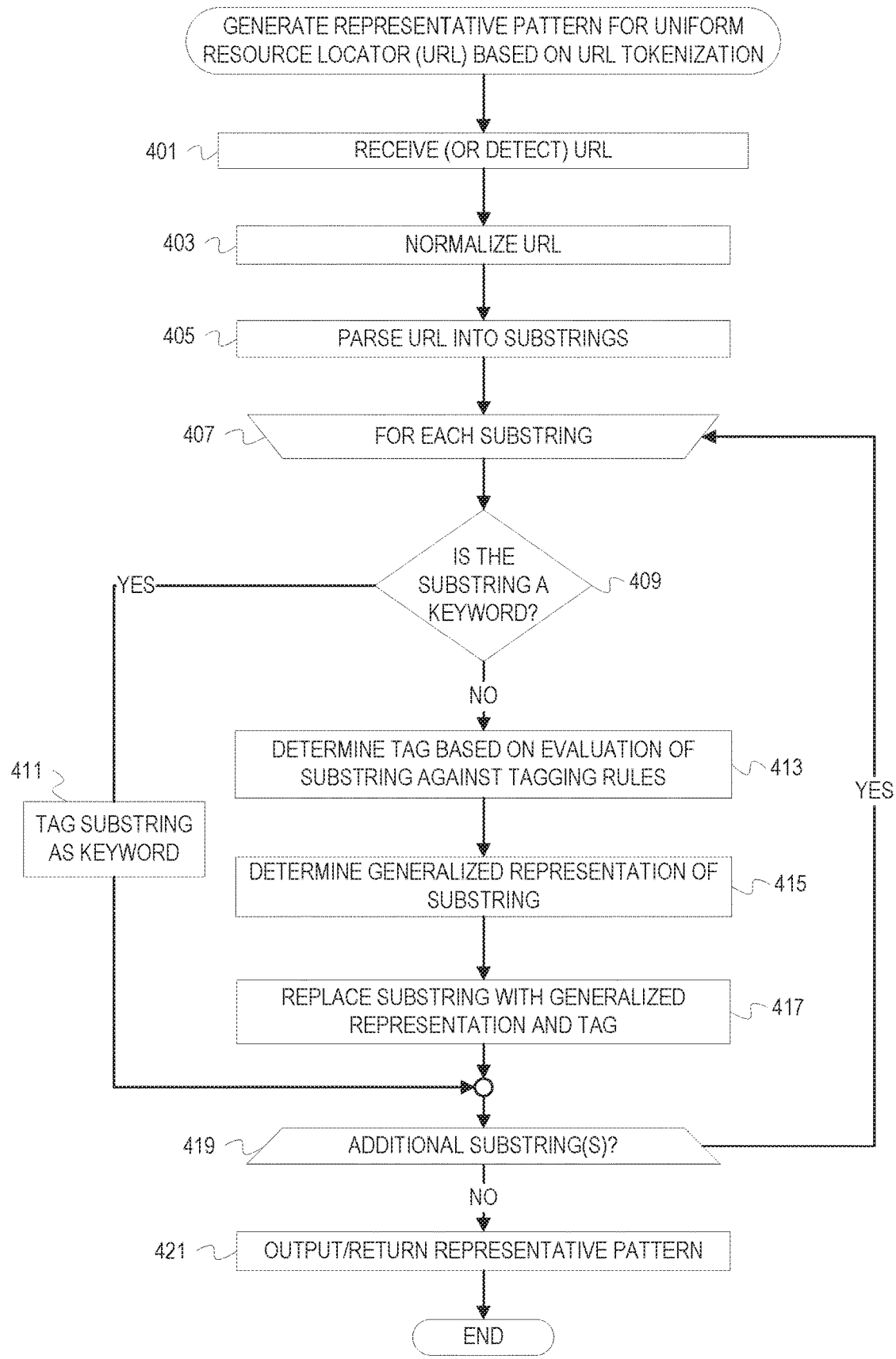
FIG. 4 depicts a flowchart of example operations for generating a representative pattern for a URL based on URL tokenization.

FIG. 4 depicts a flowchart of example operations for generating a representative pattern for a URL based on URL tokenization. The example operations are described with reference to a pattern generator for consistency with the earlier figures.

At block 401, the pattern generator receives or detects a URL. The pattern generator can be invoked by components executing in a training environment to build a repository of malicious URL patterns and by components executing in a deployment environment for pattern-based detection of malicious URLs. For the former, the pattern generator may retrieve a labeled URL from a URL repository (e.g., via an API published by the URL repository). In the deployment environment, the pattern generator can detect a URL indicated in an incoming request for a resource (e.g., in a header of an HTTP request). Pattern generation is subsequently performed for the URL which was either obtained from a URL repository or detected in a request.

At block 403, the pattern generator normalizes the URL. URL normalization includes pre-processing of the URL to ensure consistency in tokenization. The URL may be normalized to remove non-readable substrings with which the URL is formatted to improve readability of the URL for processing by subsequent components of the URL generation system. For instance, if the URL was encoded (e.g., through percent-encoding), the pattern generator can decode the encoded URL. The pattern generator can also determine if the URL does not comport with a standard format and, if so, remove a sequence(s) of characters which do not impact the content of the URL components to translate the URL into a standard format.

At block 405, the pattern generator parses the URL into substrings. The pattern generator parses the URL into substrings based on recognized delimiters which separate URL components and substrings. The pattern generator may split the substrings of the URL query component to maintain the distinct key/value pairs as individual substrings. The pattern generator can also sort the resulting substrings of the parsed URL by URL component, such as by the hostname, domain, path, and query of the URL.

At block 407, the pattern generator determines a representative token for each of the substrings of the parsed URL. While FIG. 4 depicts the pattern generator as determining a representative token for each substring of the parsed URL, in some implementations, the pattern generator may determine a representative token for a subset of substrings of the parsed URL; that is, some substrings may not be replaced with a representative token.

At block 409, the pattern generator determines if the substring is a keyword. The text of substrings which correspond to keywords, or words which frequently are used in URLs, is maintained during pattern generation. The pattern generator can determine whether the substring is a keyword based on submitting a query which indicates the keyword to a keyword repository. The pattern generator then determines if the substring is a keyword based on results of the submitted query. If the substring is a keyword, operations continue at block 411. If the substring is not a keyword, operations continue at block 413.

At block 411, the pattern generator tags the substring as a keyword. The pattern generator associates a tag used to identify keywords with the substring to indicate that the substring is a keyword. As an example, the substring may be associated with a tag "#kw #" that is used to identify keywords as depicted in FIGS. 1 and 2. Operations proceed from block 411 to block 419.

At block 413, the pattern generator determines a tag for the substring based on evaluation of the substring against tagging rules. Tagging rules comprise rules for determining a tag with which to associate a substring. The tagging rules may, for instance, indicate a set of possible tags for association with substrings and a respective regular expression (s) which a substring can match. The substring is evaluated against the tagging rules to identify a respective one of the rules which the substring satisfies. A substring can be considered to satisfy a rule if the substring matches the regular expression indicated in the rule. The pattern generator then selects the respective tag indicated in the rule which was satisfied.

At block 415, the pattern generator determines a generalized representation of the substring. As described in reference to FIG. 1, the generalized representation of the substring is an abstraction of the substring text which indicates characteristics of the substring. The pattern generator can determine the generalized representation of the substring based on evaluating characteristics of the substring, such as character types and length, and concatenating one or more identifiers determined based on the evaluated characteristics. For instance, characteristics of the substring can be evaluated based on a set of regular expressions which facilitate a determination of the character types included in a sub string (i.e., letters, numbers, and/or symbols). Alternatively or in addition, substring length can be evaluated to determine an identifier indicative of substring length based on one or more substring length ranges associated with length identifiers. As an example, a length identifier of 1 may be associated with a length range of 1-4 characters, a length identifier of 2 with a length range of 5-8 characters, etc. Identifiers can then be selected and concatenated based on the substring matching a respective regular expression(s) and/or based on the length range to which the substring length corresponds.

At block 417, the pattern generator replaces the substring with the generalized representation and tag. The generalized representation and tag constitute a token representation of the substring which replaces the substring in the representative pattern generated for the URL. The pattern generator can replace the substring with the generalized representation by associating the tag with the substring and replacing the substring text with the generalized representation, associating the generalized representation with the tag and replacing the substring with the tagged generalized representation, etc.

At block 419, the pattern generator determines if additional substrings of the parsed URL remain for determination of a representative token. If one or more substrings of the parsed URL are remaining, operations continue at block 407. If there are no remaining substrings of the parsed URL and the pattern generator has determined a representative token for each of the substrings, operations continue at block 421.

At block 421, the pattern generator outputs or returns the representative pattern. Once the pattern generator has determined a representative token for each of the substrings, the pattern representation of the URL comprising a plurality of representative tokens results. The representative pattern may include one or more sub-patterns corresponding to each of the URL components by which the substrings were sorted at block 405. For instance, the representative pattern may include a hostname sub-pattern, a domain sub-pattern, a path sub-pattern, and a query sub-pattern, where each of the sub-patterns includes a respective subset of the representative tokens.

Figure 5:
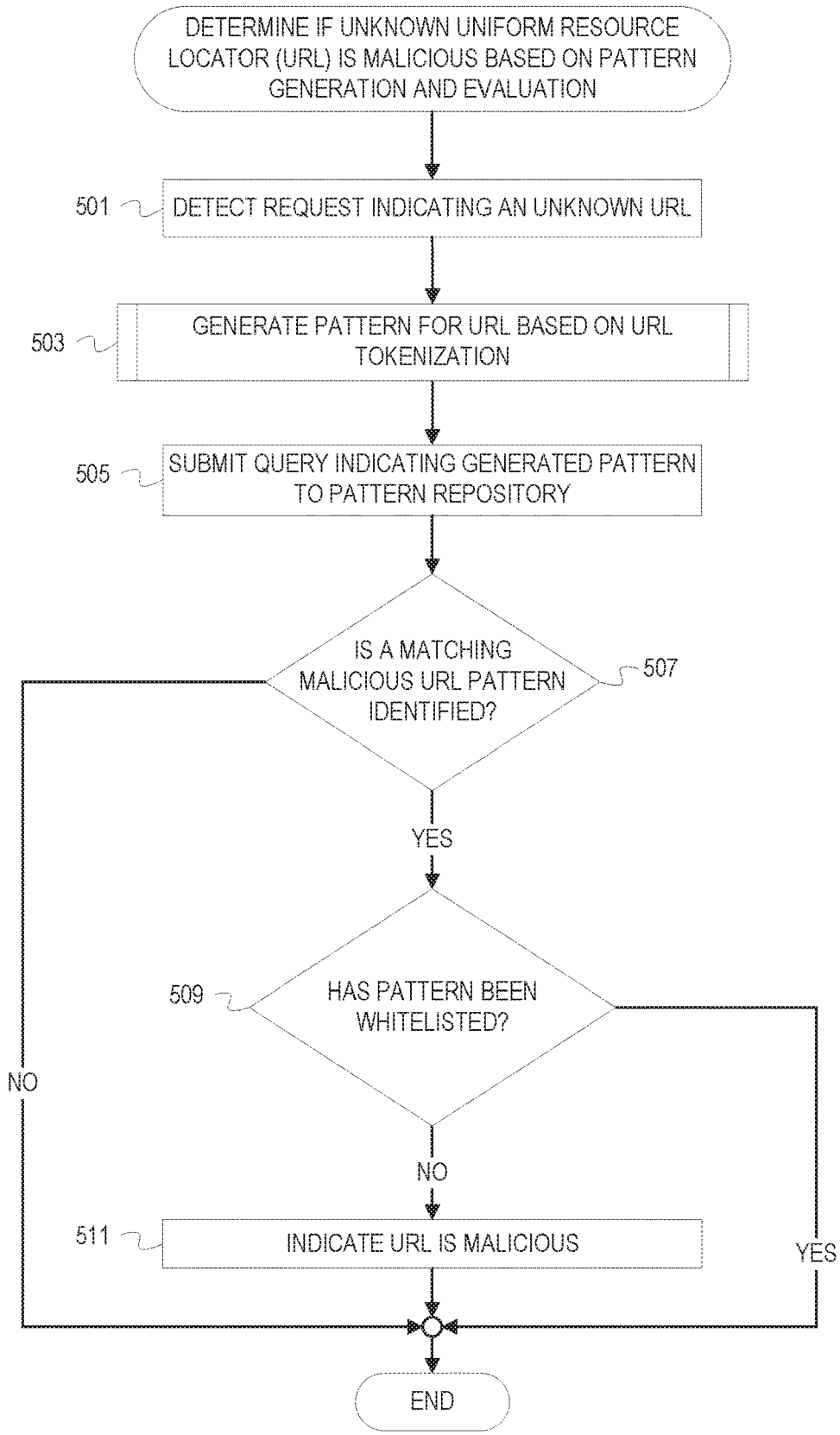
FIG. 5 depicts a flowchart of example operations for determining if an unknown URL is malicious based on pattern generation and evaluation.

FIG. 5 depicts a flowchart of example operations for determining if an unknown URL is malicious based on pattern generation and evaluation. The example operations are described with reference to a pattern-based malicious URL detection system ("detection system") for consistency with the earlier figures.

At block 501, the detection system detects a request which indicates an unknown URL. For instance, the detection system can detect an incoming HTTP request. The detection system can then identify the URL indicated in the header of the detected HTTP request.

At block 503, a pattern is generated for the URL based on URL tokenization. The pattern can be generated for the URL as described in reference to FIG. 4. For instance, the detection system can invoke a component(s) which performs the pattern generation operations described in reference to FIG. 4.

At block 505, the detection system submits a query indicating the generated pattern to a pattern repository. The pattern repository stores patterns which were previously generated as described in reference to FIG. 4 from known URLs. The detection system generates and submits a query to determine whether the pattern generated for the unknown URL matches a malicious URL pattern in the pattern repository, which is indicative that the URL may be malicious. The submitted query can indicate the generated pattern as a plurality of sub-patterns, where each sub-pattern corresponds to a component of the URL (e.g., hostname, domain, path, query, etc.).

At block 507, the detection system determines if a matching malicious URL pattern is identified. The detection system determines if a matching pattern is identified based on results of the query submitted to the pattern repository. For instance, the detection system can determine a match has been identified if the results indicate a malicious URL pattern as a matching pattern. The detection system can instead determine that a match has not been identified if the results do not indicate a matching pattern or if the results indicate a benign URL pattern as a match. In some implementations, a pattern can be considered a match if it at least partially matches the generated pattern. Evaluation of partial matches which are sufficient for identification of a pattern match is further described in reference to FIG. 6. If a matching pattern is identified, operations continue at block 509. If a matching pattern is not identified, operations are complete.

At block 509, the detection system determines if the generated pattern has been whitelisted. Before indicating that the URL is malicious, the detection system can verify whether the generated pattern has been whitelisted to reduce false positives. For instance, the detection system can determine that the generated pattern has been whitelisted based on generating and submitting a query to a repository of whitelisted patterns which correspond to benign URLs. Alternatively or in addition, the detection system can query an additional whitelist, such as a whitelist of static IP addresses, to supplement the determination of whether to indicate that the URL is malicious. If the generated pattern is not whitelisted and therefore has not been determined to correspond to a benign URL, operations continue at block 511. If the generated pattern has been whitelisted, operations are complete.

At block 511, the detection system indicates that the URL is malicious. The detection system can indicate that the URL is malicious by blocking the detected request. Alternatively or in addition, the detection system can log the attempted access, generate a notification indicating the URL is malicious, etc.

Figure 6:
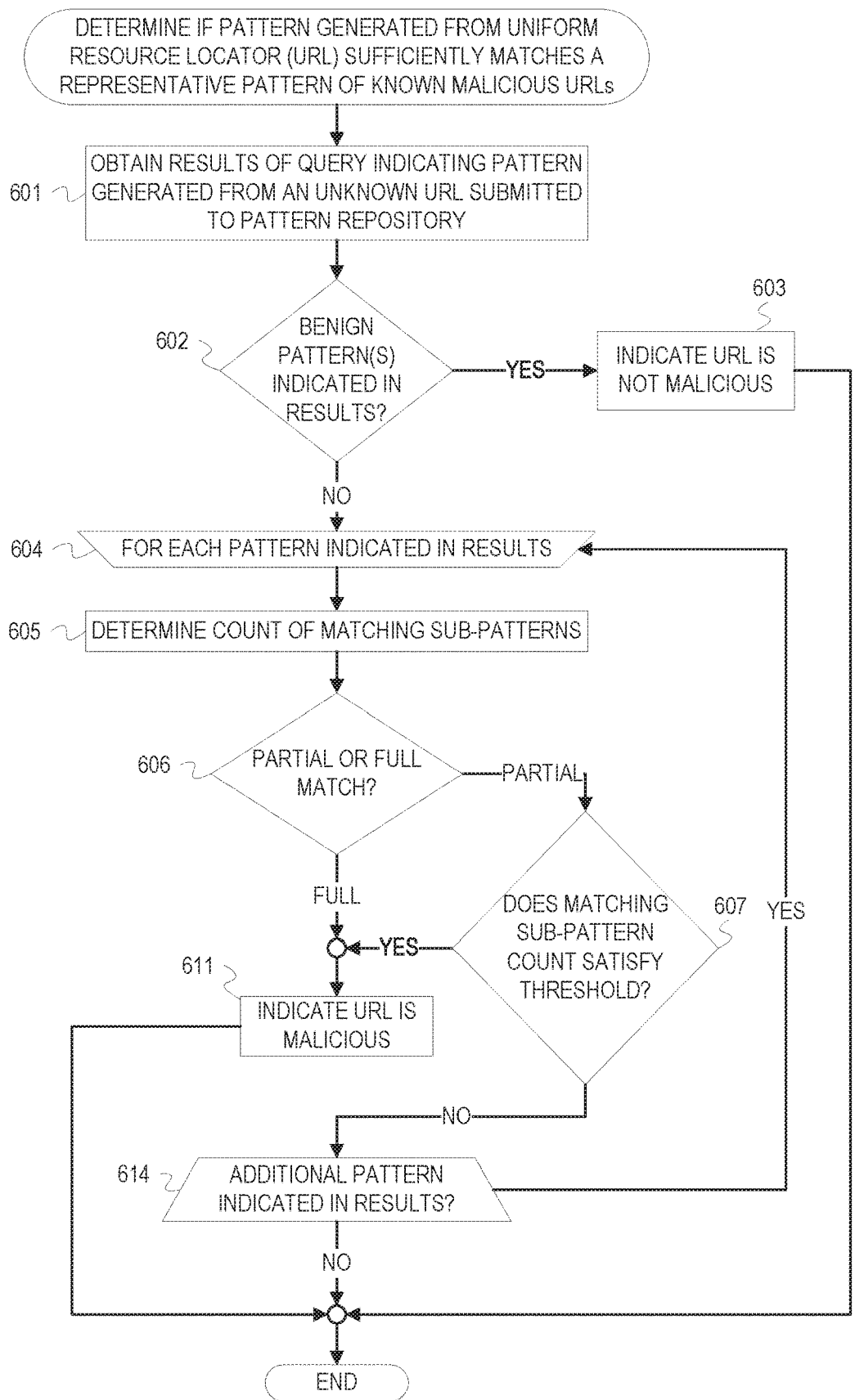
FIG. 6 depicts a flowchart of example operations for determining if an unknown URL is malicious based on whether a representative pattern generated for the URL sufficiently matches a representative pattern of known malicious URLs.

FIG. 6 depicts a flowchart of example operations for determining if an unknown URL is malicious based on whether a representative pattern generated for the URL sufficiently matches a representative pattern of known malicious URLs. The example operations are described with reference to a pattern-based malicious URL detection system ("detection system") for consistency with the earlier figures. The description of FIG. 6 assumes that the detection system has submitted a query indicating a generated pattern to a pattern repository and received results indicating at least a first pattern which is stored in the repository.

At block 601, the detection system obtains results of a query indicating a pattern generated from an unknown URL which was submitted to a pattern repository. The results of the query indicate one or more patterns which are at least a partial match of the generated pattern. For instance, the results may indicate one or more patterns which have at least a first sub-pattern (i.e., a pattern generated for a URL component) which matches the generated pattern. The results can include malicious URL patterns and/or benign URL patterns that at least partially match the generated pattern.

At block 602, the detection system determines if at least one benign URL pattern is indicated in the results. Whitelisted patterns which correspond to benign URLs may be maintained in the repository to reduce false positive detections of malicious URLs. An indication that the generated pattern at least partially matches a benign URL pattern (e.g., based on one or more sub-patterns matching) based on a benign pattern(s) being included in the results may indicate that the URL corresponding to the generated pattern should not be considered malicious. A minimum number of sub-pattern matches (e.g., 1) to benign patterns can be configured. If a benign pattern is indicated in the results, operations continue at block 603. If there are no benign patterns indicated in the results, operations continue at block 604.

At block 603, the detection system indicates that the URL is not malicious. Identification of at least a partial match between the generated pattern and a benign pattern(s) may trigger the detection system to indicate that the URL is not malicious. Indicating that the URL is not malicious may include indicating that the request for access to the resource associated with the URL should be allowed or flagging the URL for further analysis, for example.

At block 604, the detection system begins evaluating each of the patterns identified from results of the submitted query. The detection system may evaluate patterns indicated in the results until at least a partial match which is determined to be a sufficient match is identified. The pattern indicated in the results of the query which the detection system identifies and evaluates at the current iteration is hereinafter referred to as the "identified pattern."

At block 605, the detection system determines a count of matching sub-patterns. The detection system compares the sub-patterns of the identified pattern and the generated pattern to determine a count of those which match. For example, if the generated and identified patterns have a query pattern and a hostname pattern in common, the detection system determines a count of two.

At block 606, the detection system determines if the match is a partial match or a full match. A full match is identified if each of the sub-patterns of the generated and identified patterns match (e.g., the hostname pattern, domain pattern, path pattern, and query pattern), or if the matching sub-pattern count is equal to the number of sub-patterns in each of the generated and identified patterns. A partial match is identified if some, but not all, of the sub-patterns of the generated and identified patterns match (e.g., the hostname pattern and path pattern, but not the query and domain patterns). If a partial match has been identified, operations continue at block 607. If a full match has been identified, operations continue at block 611. The extent of matching for a complete or partial match can be configurable in embodiments. For example, a complete match can be defined as at least 80% of the sub-patterns matching with malicious URL patterns. Similarly, a floor for a partial match can be configured or defined as at least 20% of the generated sub-patterns matching malicious URL patterns.

At block 607, the detection system determines if the matching sub-pattern count satisfies a threshold. The detection system can maintain a threshold indicating a minimum number of sub-patterns of generated and identified patterns which should match for the patterns to be considered to sufficiently match. The detection system evaluates the count of matching sub-patterns determined at block 604 against this threshold. If the matching sub-pattern count satisfies the threshold, the identified pattern and generated pattern are considered to sufficiently match, and operations continue at block 611. If the threshold is not satisfied, the detection system determines that the generated and identified patterns do not sufficiently match and may indicate that the URL is not malicious, and operations continue to block 614.

At block 611, the detection system indicates that the URL is malicious. The detection system can indicate that the URL is malicious by blocking the detected request. Alternatively or in addition, the detection system can log the attempted access, generate a notification indicating the URL is malicious, etc.

At block 614, the detection system determines if an additional pattern is indicated in the results of the submitted query. Pattern evaluation operations can continue to determine if at least a first of the remaining patterns indicated in the results is at least a partial match which triggers a determination that the URL is malicious. If an additional pattern is indicated in the results of the submitted query, operations continue at block 604. If there are no additional patterns indicated in the results of the submitted query, operations are complete.

Figure 7:
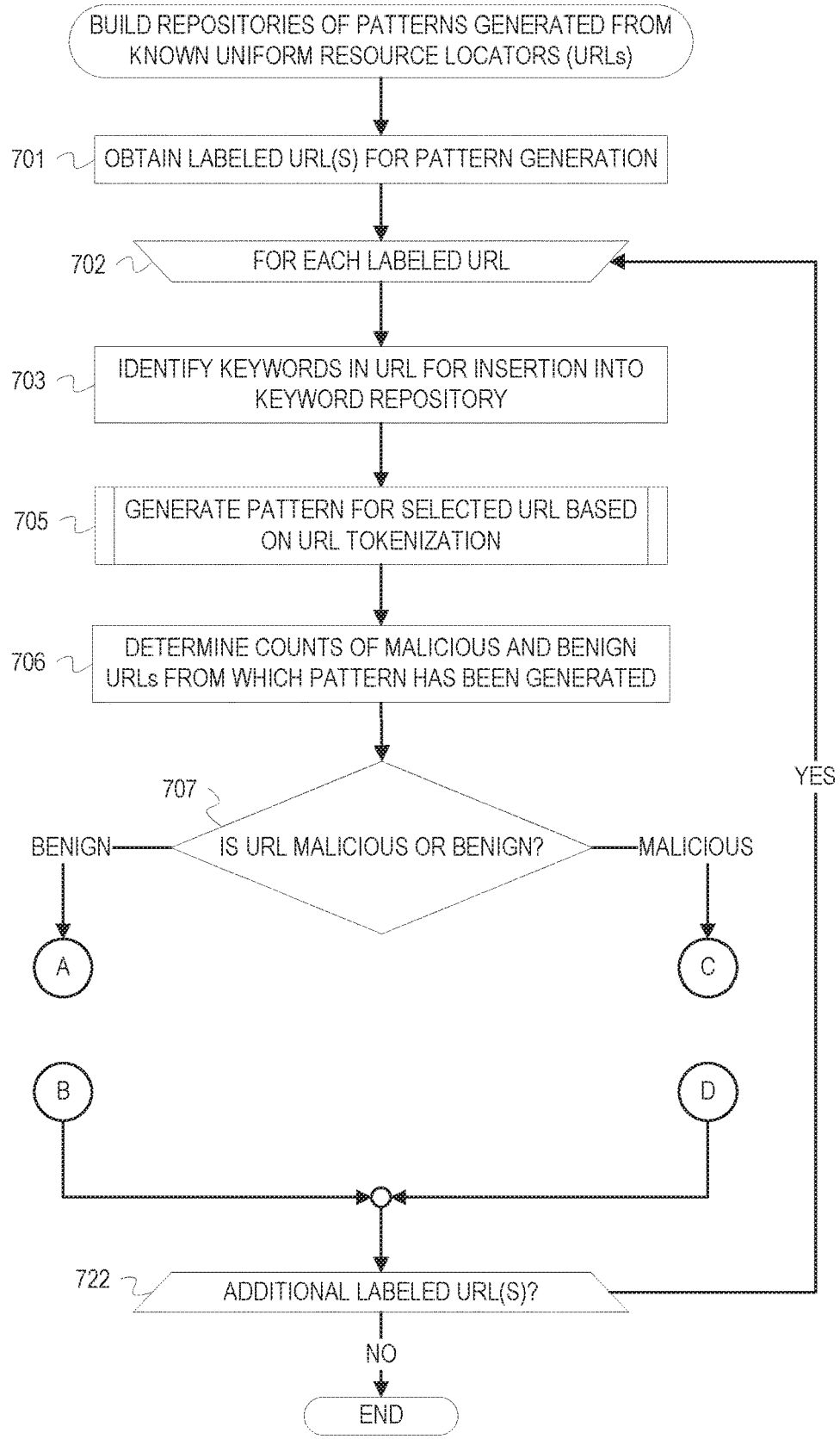
FIGS. 7-8 depict a flowchart of example operations for building a repository of patterns generated from known URLs.
Figure 8:
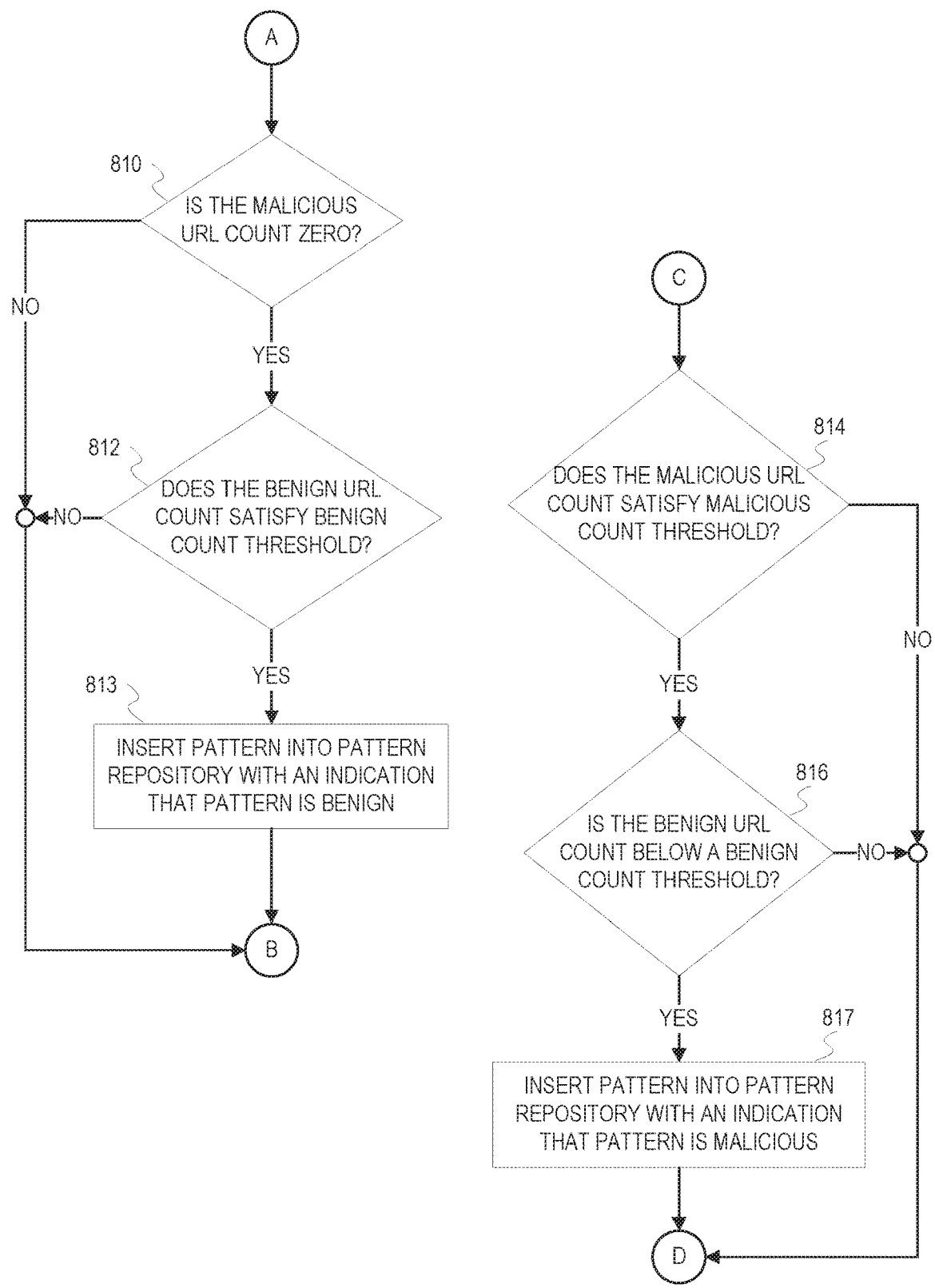

FIGS. 7-8 depict a flowchart of example operations for building a repository of patterns generated from known URLs. The example operations are described with reference to a URL pattern generation system ("pattern generation system") for consistency with FIG. 1. Operations of the flowchart of FIGS. 7-8 continue among each other through transition points A-D.

At block 701, the pattern generation system obtains one or more labeled URLs from a URL repository. The pattern generation system can retrieve URLs labeled as malicious or benign from a URL repository as the URLs are published to the repository. For instance, the pattern generation system may periodically poll the URL repository for URLs which have been added since the last pattern generation event (e.g., via an API published by the URL repository). As another example, the URL repository may be configured to push updates to the pattern generation system as new URLs are added to the repository.

At block 702, the pattern generation system begins URL pattern generation for each labeled URL obtained at block 701. The pattern generation system selects a labeled URL which may be known malicious or known benign and is associated with a corresponding label.

At block 703, the pattern generation system identifies substrings of the URL which are keywords and adds the identified keywords to a keyword repository. The pattern generation system analyzes the URL based on one or more rules for keyword extraction to determine whether the URL includes any keywords. The pattern generation system can determine substrings of the URL which are keywords by parsing the URL based on one or more delimiters and evaluating each of the resulting substrings against the rules for keyword extraction. For instance, the rules for keyword extraction can indicate a threshold frequency of occurrence in various URLs which, if exceeded by a frequency of occurrence associated with a substring of the URL, triggers identification of the substring as a keyword. Frequencies of occurrences of substrings may have been previously determined and made accessible to the pattern generation system upon insertion of URLs into the URL repository and may be updated at each URL repository insertion event. Substrings of the URL which satisfy a rule for keyword extraction are inserted into the keyword repository.

At block 705, the pattern generation system generates a pattern for the selected URL based on URL tokenization. The pattern can be generated for the URL as described in reference to FIG. 4. For instance, the pattern generation system can invoke the pattern generator described in reference to FIGS. 1 and 2. The pattern generation system may leverage the parsed URL generated at block 703 for generating the pattern. As an example, the parsed URL may be passed to the pattern generator upon its invocation.

At block 706, the pattern generation system determines counts of different malicious URLs and benign URLs from which the pattern has been generated. The malicious URL count corresponds to a cumulative number of known malicious URLs from which the pattern has been generated, while the benign URL count corresponds to a cumulative number of known benign URLs from which the pattern has been generated. For instance, counters may be maintained for each generated pattern indicating cumulative numbers of known malicious URLs and known benign URLs from which that pattern has been generated, where a counter maintained for a pattern is updated upon each pattern generation event from a known malicious or known benign URL which produces the pattern. The pattern generation system may thus determine the malicious URL count and benign URL count of the pattern based on identifying the counters maintained for the pattern and determining the values of each of the counters.

At block 707, the pattern generation system determines if the selected URL is malicious or benign. The pattern generation system can determine if the URL is malicious or benign based on the label which was associated with the URL upon its retrieval from the URL repository. If the selected URL is malicious, operations continue at block 814. If the selected URL is benign, operations continue at block 810.

At block 810, the pattern generation system determines if the malicious URL count is zero. A malicious URL count of zero indicates that the pattern has not been generated from a URL known to be malicious. If the malicious URL count is zero, operations continue at block 812. If the malicious URL count is not zero, operations continue at block 722.

At block 812, the pattern generation system determines if the benign URL count satisfies a benign URL count threshold. The pattern generation system can maintain a threshold indicating a benign URL count which should be satisfied before a pattern generated from a known benign URL is inserted into the pattern repository labeled as a benign pattern. As an example, the pattern generation system may maintain a threshold with a value of 25 (i.e., 25 benign URLs). The pattern generation system can therefore base a determination of whether the pattern should be inserted into the pattern repository as a benign URL pattern based on whether the benign URL count for the pattern indicates that the number of known benign URLs from which the pattern has been generated satisfies the threshold, such as at least 25 benign URLs. If the benign URL count satisfies the benign URL count threshold, operations continue at block 813. If the benign URL count does not satisfy the benign URL count threshold, operations continue at block 722.

At block 813, the pattern generation system inserts the pattern into the pattern repository with an indication that the pattern is a benign URL pattern (e.g., a label). For example, the pattern generation system can insert the pattern into the pattern repository via an API for a database insert command, an API for an HTTP PUT request issued to a server which maintains the pattern repository, etc. The insertion of the pattern into the pattern repository is based on the pattern having been generated from a number of benign URLs which satisfies the threshold for insertion and also is not known to correspond to at least one malicious URL. Adding benign URL patterns into the pattern repository can reduce false positives during subsequent malicious URL detection operations.

At block 814, the pattern generation system determines if the malicious URL count satisfies a malicious URL count threshold. The pattern generation system can maintain a threshold indicating a malicious URL count which should be satisfied before a pattern generated from a known malicious URL is inserted into the pattern repository labeled as a malicious URL pattern. As an example, the pattern generation system may maintain a threshold with a value of 25 (i.e., 25 malicious URLs). The pattern generation system can therefore base a determination of whether the pattern should be inserted into the pattern repository based on whether the malicious URL count for the pattern indicates that the number of known malicious URLs from which the pattern has been generated satisfies the threshold, such as at least 25 malicious URLs. If the malicious URL count satisfies the malicious URL count threshold, operations continue at block 816. If the malicious URL count does not satisfy the malicious URL count threshold, operations continue at block 722.

At block 816, the pattern generation system determines if the benign URL count is below a benign URL count threshold. The pattern generation system may maintain a benign URL count threshold which corresponds to a maximum number of benign URLs from which the pattern most recently generated from a malicious URL has been generated to still be labeled as a malicious URL pattern. The benign URL count threshold relative to the malicious URL count threshold may be indicative of a maximum percentage of the URLs from which the pattern was generated which were benign to proceed with labeling the pattern as a malicious URL pattern. As an example, the thresholds may indicate that a maximum of 5% of the total URLs from which the pattern was generated can be benign URLs in order to label the pattern as malicious (e.g., malicious and benign URL count thresholds of 20 and 1, respectively). If the benign URL count is below the benign URL count threshold, operations continue at block 817. If the benign URL count is not below the benign URL count threshold, operations continue at block 722.

At block 817, the pattern generation system inserts the pattern into the pattern repository with an indication that the pattern is a malicious URL pattern. For example, the pattern generation system can insert the pattern into the pattern repository via an API for a database insert command, an API for an HTTP PUT request issued to a server which maintains the pattern repository, etc. Upon insertion into the pattern repository, the pattern can subsequently be retrieved via submissions of queries which indicate the pattern. For instance, the pattern repository may be a repository which can be queried by sub-patterns to obtain patterns having the one or more sub-patterns indicated in the query.

At block 722, the pattern generation system determines if one or more labeled URLs remain for selection. If one or more labeled URLs remain for selection, operations continue at block 702. If no labeled URLs are remaining, operations are complete.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 407-419 (i.e., the set of substring evaluations) can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus. Additionally, the name(s) chosen for the program code used in the flowcharts is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
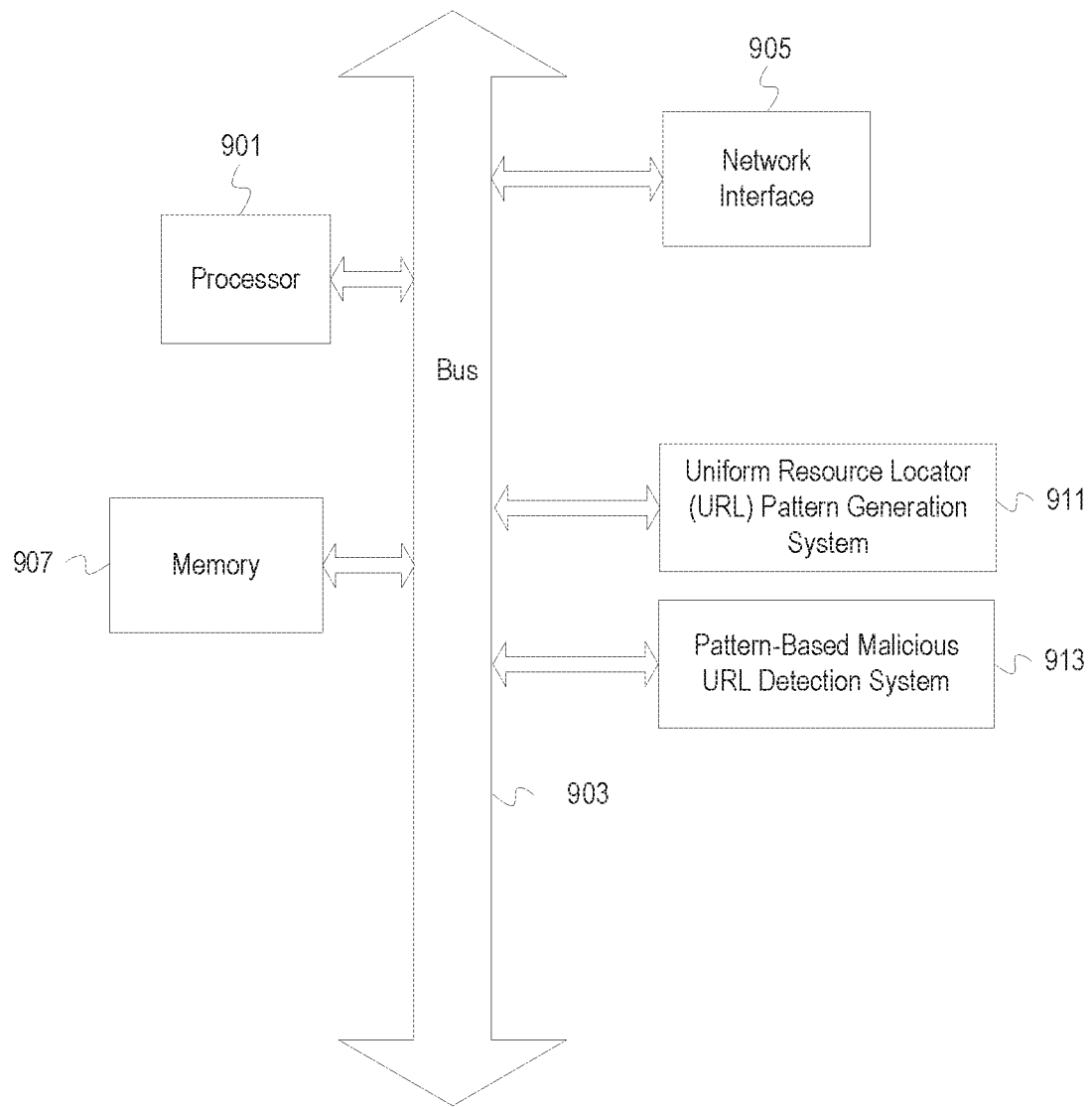
FIG. 9 depicts an example computer system with a URL pattern generation system and a pattern-based malicious URL detection system.

FIG. 9 depicts an example computer system with a URL pattern generation system and a pattern-based malicious URL detection system. The computer system includes a processor 901 (possibly including multiple processors, multiple cores, multiple nodes, and/or implementing multithreading, etc.). The computer system includes memory 907. The memory 907 may be system memory or any one or more of the above already described possible realizations of machine-readable media. The computer system also includes a bus 903 and a network interface 805. The system also includes URL pattern generation system 911 and pattern-based malicious URL detection system 913. The URL pattern generation system 911 generates patterns from URLs known to be malicious or benign and inserts patterns generated from malicious URLs and/or benign URLs which satisfy criteria for insertion into a pattern repository. The pattern-based malicious URL detection system 913 generates a pattern for an unknown URL and determines whether the URL is malicious based on querying the pattern repository for a matching pattern. The URL pattern generation system 911 and the pattern-based malicious URL detection system 913 do not necessarily execute on the same computer system. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 8 (e.g., video cards, audio cards, additional network interfaces, peripheral devices, etc.). The processor 901 and the network interface 805 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for pattern based detection of malicious URLs as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    identifying a uniform resource locator (URL) indicated in a request for a first resource;
    parsing the URL into a plurality of substrings;
    determining a representative token for a first substring of the plurality of substrings that indicates at least one of a type of the first substring and an abstracted representation of the first substring;
    generating a representative pattern for the URL based on replacing the first substring with the representative token;
    determining if a pattern which matches the representative pattern can be identified among a plurality of patterns previously generated from known malicious URLs; and
    based on identifying a first pattern of the plurality of patterns that at least partially matches the representative pattern, indicating that the URL is malicious.

2. The method of claim 1, wherein the plurality of patterns previously generated from the known malicious URLs are maintained in a repository of patterns, and wherein determining if a pattern which matches the representative pattern can be identified comprises submitting a query indicating the representative pattern to the repository of patterns and determining if the first pattern of the plurality of patterns is indicated in a response to the query.

3. The method of claim 1, wherein the representative token comprises at least one of a tag indicating the type of the first substring and the abstracted representation of the first substring.

4. The method of claim 3, wherein determining the representative token comprises determining the tag based, at least in part, on evaluating the first substring against at least a first rule for tag determination.

5. The method of claim 4, wherein the first rule comprises an indication of the tag and a regular expression, wherein determining the tag comprises determining that the regular expression matches the first substring.

6. The method of claim 3, wherein the abstracted representation of the first substring comprises one or more identifiers, wherein each of the one or more identifiers indicates a length of the first substring or a type of a character included in the first substring.

7. The method of claim 1, further comprising determining if the first substring is a keyword, wherein replacing the first substring the representative token comprises associating the first substring with a tag indicating that the first substring is a keyword based on determining that the first substring is a keyword.

8. The method of claim 7, wherein determining if the first substring is a keyword comprises submitting a query indicating the first substring to a repository of keywords, wherein the repository of keywords stores a plurality of keywords previously identified from at least one of the known malicious URLs and known benign URLs.

9. The method of claim 1, further comprising normalizing the URL, wherein parsing the URL comprises parsing the normalized URL.

10. The method of claim 1, further comprising generating the plurality of patterns from the known malicious URLs based on, for each of the known malicious URLs, replacing at least a second substring in the known malicious URL with a representative token to generate a corresponding one of the plurality of patterns.

11. The method of claim 1, wherein the request comprises a Hypertext Transfer Protocol (HTTP) request, and wherein identifying the URL comprises identifying the URL based on a header of the HTTP request.

12. A non-transitory, computer-readable medium having program code stored thereon, the program code comprising instructions to:
    parse a uniform resource locator (URL) into substrings;
    generate a plurality of sub-patterns for the URL based, at least in part, on replacement of at least a first of the substrings of the URL with a token representation indicating at least one of a type and an abstraction of the first substring;
    determine an extent of matching between the plurality of sub-patterns and a plurality of known URL patterns, wherein the plurality of known URL patterns at least include malicious URL patterns; and based on a determination that the extent of matching between the plurality of sub-patterns and the malicious URL patterns satisfies a first threshold, indicate the URL as malicious.

13. The non-transitory, computer-readable medium of claim 12, wherein the program code further comprises instructions to:
indicate that the URL is not malicious based, at least partly, on a determination that the extent of matching between the plurality of sub-patterns and benign URL patterns satisfies a minimum number,
wherein the instructions to determine an extent of matching between the plurality of sub-patterns and a plurality of known URL patterns comprise instructions to determine whether the minimum number of the plurality of sub-patterns matches the benign URL patterns which are included in the plurality of known URL patterns.

14. The non-transitory, computer-readable medium of claim 12, wherein the instructions to determine an extent of matching between the plurality of sub-patterns and a plurality of known URL patterns comprise instructions to count a number of the plurality of sub-patterns with matches in the malicious URL patterns.

15. The non-transitory, computer-readable medium of claim 12, wherein the program code further comprises instructions to:
indicate that the URL is malicious based on a determination that a pattern formed by the plurality of sub-patterns matches one of the malicious URL patterns,
wherein the instructions to determine an extent of matching between the plurality of sub-patterns and a plurality of known URL patterns comprise instructions to determine whether the pattern formed by the plurality of sub-patterns matches one of the malicious URL patterns.

16. An apparatus comprising:
a processor; and
a computer-readable medium having instructions stored thereon that are executable by the processor to cause the apparatus to,
identify a uniform resource locator (URL) indicated in a request for a first resource;
parse the URL into a plurality of substrings;
determine a representative token with which to replace a first substring of the plurality of substrings of the URL, the representative token indicating at least one of a type of the first substring and an abstracted representation of the first substring;
replace the first substring with the representative token to generate a representative pattern for the URL;
determine if a pattern which at least partially matches the representative pattern can be identified among a plurality of patterns previously generated from known malicious URLs; and
based on identification of a first pattern of the plurality of patterns that at least partially matches the representative pattern, indicate that the URL is malicious.

17. The apparatus of claim 16, wherein the plurality of patterns generated from known malicious URLs are maintained in a repository of patterns, wherein the instructions executable by the processor to cause the apparatus to determine if a pattern which at least partially matches the representative pattern can be identified comprise instructions executable by the processor to cause the apparatus to submit a query indicating the representative pattern to the repository of patterns and determine if a response to the query indicates the first pattern.

18. The apparatus of claim 16, wherein the instructions executable by the processor to cause the apparatus to determine the representative token comprise instructions executable by the processor to cause the apparatus to determine at least one of a tag indicating the type of the first sub string and the abstracted representation of the first substring.

19. The apparatus of claim 18, wherein the instructions executable by the processor to cause the apparatus to determine the tag comprise instructions executable by processor to cause the apparatus to determine the tag based, at least in part, on evaluation of the first substring against at least a first rule for tag determination comprising a regular expression and an indication of the tag.

20. The apparatus of claim 16, further comprising instructions executable by the processor to cause the apparatus to determine if the first substring is a keyword, wherein the instructions executable by the processor to cause the apparatus to replace the first substring with the representative token comprises instructions executable by the processor to cause the apparatus to associate the first substring with a tag indicating that the first substring is a keyword based on a determination that the first substring is a keyword.

* * * * *